United States Patent
Laskowski et al.

(10) Patent No.: US 10,954,824 B2
(45) Date of Patent: Mar. 23, 2021

(54) SYSTEMS AND METHODS FOR CONTROLLING DRUM LEVELS USING FLOW

(71) Applicant: General Electric Company, Schenectady, NY (US)

(72) Inventors: Benjamin David Laskowski, Greenville, SC (US); William Forrester Seely, Greenville, SC (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 15/383,859

(22) Filed: Dec. 19, 2016

(65) Prior Publication Data

US 2018/0171829 A1    Jun. 21, 2018

(51) Int. Cl.
 *F22D 5/30* (2006.01)
 *F01K 23/10* (2006.01)
 *F02C 6/18* (2006.01)
 *F22D 5/26* (2006.01)
 *F22B 1/18* (2006.01)
 (Continued)

(52) U.S. Cl.
 CPC ............... *F01K 23/101* (2013.01); *F02C 6/18* (2013.01); *F22B 1/1815* (2013.01); *F22B 35/007* (2013.01); *F22D 5/26* (2013.01); *F22D 5/28* (2013.01); *F22D 5/30* (2013.01);
 (Continued)

(58) Field of Classification Search
 CPC ..... F22D 5/30; F22D 5/28; F22D 5/26; F22B 35/007; F22B 1/1815; F02C 6/18; F01K 23/101; Y02E 20/16; F05D 2220/32; F05D 2220/72
 See application file for complete search history.

(56) References Cited

U.S. PATENT DOCUMENTS

| 2,095,853 A | 4/1936 | Blowney |
| 4,036,011 A | 7/1977 | Gupta |

(Continued)

FOREIGN PATENT DOCUMENTS

| DE | 32 16 298 A1 | 12/1982 |
| JP | 9 317404 A | 12/1997 |

(Continued)

OTHER PUBLICATIONS

U.S. Appl. No. 62/362,276, filed Jul. 14, 2016, Benjamin David Laskowski.

(Continued)

*Primary Examiner* — Christopher E Everett

(74) *Attorney, Agent, or Firm* — Fletcher Yoder, P.C.

(57) ABSTRACT

A method includes determining, via a processor, a commanded fluid flow rate of a fluid entering or exiting the drum of an industrial system, wherein the commanded fluid flow rate comprises a rate of fluid entering the drum of the industrial system, exiting the drum of the industrial system, or a combination thereof. The method additionally includes determining, via the processor, a measured flow rate of the fluid. The method further includes determining, via the processor, a variable multiplier based at least in part on the commanded fluid flow rate and the measured flow rate; and deriving, via the processor, a multiplied flow rate command for the industrial system by applying the variable multiplier to the commanded fluid flow rate.

14 Claims, 3 Drawing Sheets

(51) Int. Cl.
*F22B 35/00* (2006.01)
*F22D 5/28* (2006.01)

(52) U.S. Cl.
CPC ...... *F05D 2220/32* (2013.01); *F05D 2220/72* (2013.01); *G05B 2219/41303* (2013.01); *Y02E 20/16* (2013.01)

(56) References Cited

U.S. PATENT DOCUMENTS

| | | | |
|---|---|---|---|
| 4,228,359 | A | 10/1980 | Matsumoto et al. |
| 4,372,121 | A | 2/1983 | Sokolov et al. |
| 4,425,762 | A | 1/1984 | Wakamatsu et al. |
| 4,550,565 | A | 11/1985 | Ozono |
| 4,558,227 | A | 12/1985 | Yanada et al. |
| 4,637,348 | A | 1/1987 | Fukayama |
| 6,807,501 | B1 | 10/2004 | Hyde |
| 6,896,404 | B2 | 5/2005 | Seki et al. |
| 7,406,371 | B2 | 7/2008 | Izawa et al. |
| 8,887,747 | B2 | 11/2014 | Kumar et al. |
| 9,217,565 | B2 | 12/2015 | Beveridge et al. |
| 2005/0085949 | A1 | 4/2005 | Kirchhof |
| 2005/0178759 | A1 | 8/2005 | Arora et al. |
| 2006/0233637 | A1 | 10/2006 | Yakushi et al. |
| 2008/0023175 | A1 | 1/2008 | Lehr et al. |
| 2009/0159018 | A1* | 6/2009 | Mehendale ........... F01K 23/101 122/451 R |
| 2010/0013243 | A1 | 1/2010 | Halsey et al. |
| 2010/0089042 | A1 | 4/2010 | King et al. |
| 2010/0126433 | A1* | 5/2010 | Kozaki ................. F22B 37/261 122/451 R |
| 2011/0056201 | A1 | 3/2011 | Kluge et al. |
| 2011/0295432 | A1* | 12/2011 | Kumar .................. F22B 1/1815 700/281 |
| 2012/0040299 | A1* | 2/2012 | Beveridge ............... F01K 13/02 432/13 |
| 2012/0131917 | A1* | 5/2012 | Piccirillo ................ F01K 13/02 60/645 |
| 2012/0173033 | A1 | 7/2012 | Tischer |
| 2013/0047613 | A1 | 2/2013 | Holt et al. |
| 2014/0187813 | A1 | 6/2014 | Kato et al. |
| 2014/0222230 | A1 | 8/2014 | Shimizu et al. |
| 2014/0331683 | A1 | 11/2014 | Mazzaro et al. |
| 2015/0168268 | A1 | 6/2015 | Fish et al. |
| 2017/0315836 | A1 | 11/2017 | Langer et al. |

FOREIGN PATENT DOCUMENTS

| | | |
|---|---|---|
| WO | 98/26336 A1 | 6/1998 |
| WO | 2007/090482 A1 | 8/2007 |

OTHER PUBLICATIONS

European Search Report pursuant to Rule 62 EPC, dated Jun. 18, 2018, pp. 1-5.
U.S. Appl. No. 15/414,475, filed Jan. 24, 2017, Benjamin David Laskoski.
Extended European Search Report for EP Application No. 18154612 dated Jul. 9, 2018.

* cited by examiner

SYSTEMS AND METHODS FOR CONTROLLING DRUM LEVELS USING FLOW

BACKGROUND OF THE INVENTION

The subject matter disclosed herein relates to industrial control systems, and more specifically, to controlling drum levels using flow.

Industrial machines, such as gas turbine systems, may provide for the generation of power. For example, the gas turbine systems typically include a compressor for compressing a working fluid, such as air, a combustor for combusting the compressed working fluid with fuel, and a turbine for turning the combusted fluid into a rotative power. For example, the compressed air is injected into a combustor, which heats the fluid causing it to expand, and the expanded fluid is forced through the turbine. In certain combined cycle systems, exhaust from the turbine may be provided to a downstream system such as a heat recovery steam generation (HRSG) system, which may include one or more drums. The HRSG may recover additional thermal energy from the exhaust by using the drums to generate steam suitable to power one or more steam turbines. Accordingly, the HRSG may include one or more drums having different levels of water that may provide for the generation of steam. It would be beneficial to improve level rate of certain machinery, such as HRSG machinery having drums.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes determining, via a processor, a commanded fluid flow rate of a fluid entering or exiting the drum of an industrial system, wherein the commanded fluid flow rate comprises a rate of fluid entering the drum of the industrial system, exiting the drum of the industrial system, or a combination thereof. The method additionally includes determining, via the processor, a measured flow rate of the fluid. The method further includes determining, via the processor, a variable multiplier based at least in part on the commanded fluid flow rate and the measured flow rate; and deriving, via the processor, a multiplied flow rate command for the industrial system by applying the variable multiplier to the commanded fluid flow rate.

In a second embodiment, a system includes a controller configured to operatively couple to an industrial system having a drum, wherein the controller comprises a processor, wherein the processor is configured to determine a commanded fluid flow rate of the drum of the industrial system, wherein the commanded fluid flow rate comprises a rate of fluid entering the drum of the industrial system, exiting the drum of the industrial system, or a combination thereof. The processor is additionally configured to determine a measured flow rate of the drum. The processor is further configured to determine a variable multiplier based at least in part on the commanded fluid flow rate and the measured flow rate; and to derive a multiplied flow rate command for the industrial system by applying the variable multiplier to the commanded fluid flow rate.

In a third embodiment, one or more tangible, non-transitory, machine-readable media including instructions that cause a processor to determine a commanded fluid flow rate of a drum of an industrial system, wherein the commanded fluid flow rate comprises a rate of fluid entering the drum of the industrial system, exiting the drum of the industrial system, or a combination thereof. The instructions additionally cause the processor to determine a measured flow rate of the drum. The instructions further cause the processor to determine a variable multiplier based at least in part on the commanded fluid flow rate and the measured flow rate; and to derive a multiplied flow rate command for the industrial system by applying the variable multiplier to the commanded fluid flow rate.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
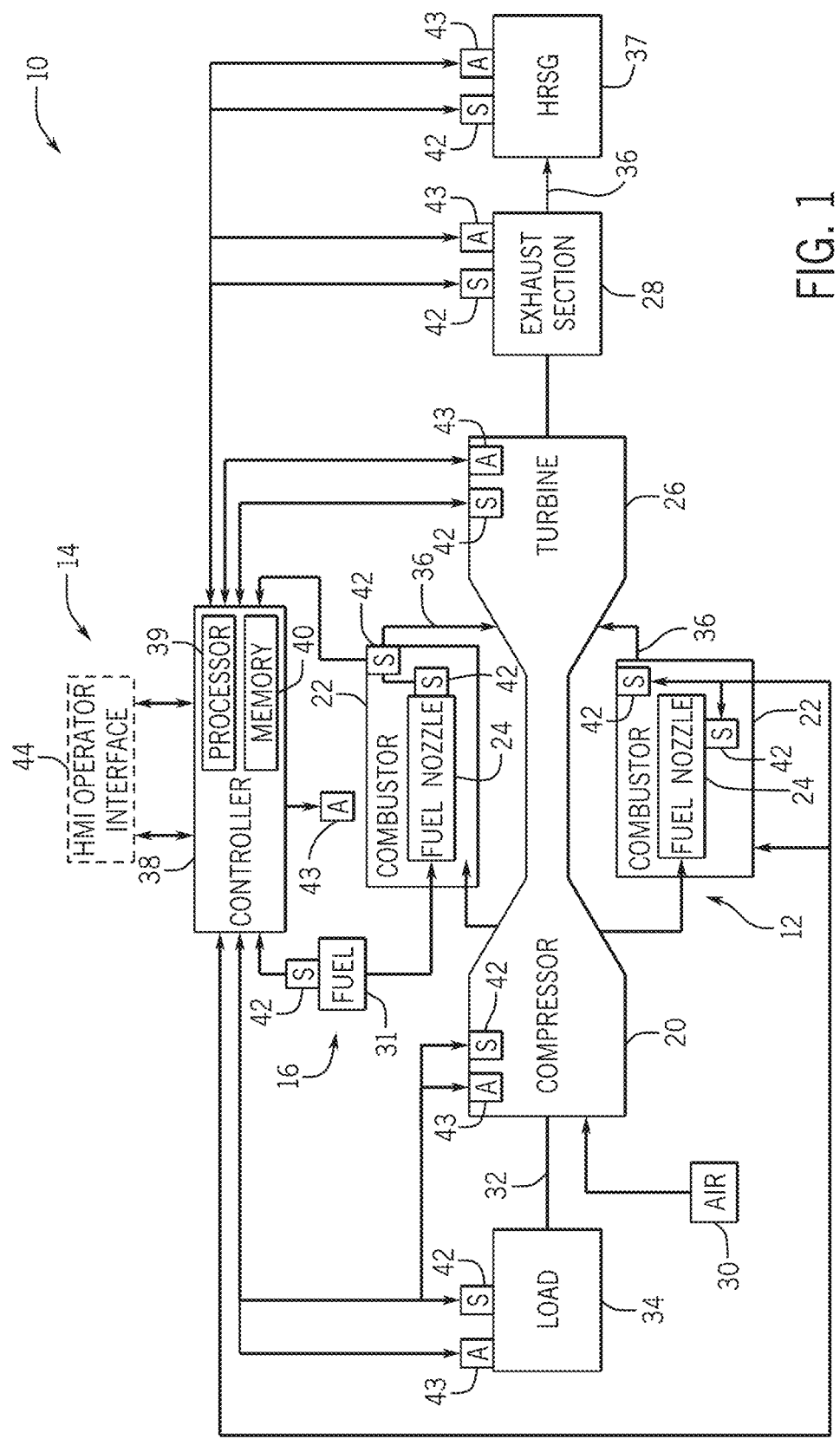
FIG. 1 is a block diagram of an embodiment of an industrial system including one or more industrial machines, in accordance with the present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An industrial control system may control a level rate of an industrial system, such as a drum disposed in a heat recovery steam generation (HRSG) system, by applying, for example a direct level control. That is, liquid level in one or more drums of the HRSG may be monitored and liquid (e.g., water) may be added or removed based on a comparison between a current liquid level and a desired level. For example, lookup up tables may be used to determine a desired liquid level based on a current liquid level. The techniques described herein may alternatively or additionally control fluid flow (e.g., rate of fluid flow). That is, in certain embodiments, drum fluid flow rates may be controlled, as opposed to drum fluid levels.

For example, a water level in a drum may be typically controlled by adjusting the water flow into the tank over the course of a plant or HRSG startup to maintain some desired objective. Because water may be admitted to but not drained from the drum during startup, the water level may intentionally start low and ramp up through the course of the plant startup. Applying the techniques described herein, in one embodiment, a desired water level is set as a constant, and only water flow is controlled to hold the desired water level. Indeed, a problem to be solved may be reframed as deriving a desired water flow with respect to time by "backing out" or otherwise deriving the desired water flow based on certain drum geometry and fluid dynamics. In certain embodiments, an output of a control system may then be the desired water flow to meet the constant level objective.

Accordingly, present embodiments relate to systems and methods for controlling a fluid level flow based on, for example, a desired level of fluid in the industrial system. In HRSG embodiments, the control may include "swell" and or "shrink" control where expansion and/or contraction of certain drums may occur, for example, during startup of the HRSG. In certain embodiments, variable flow multipliers may be used, as opposed to fixed flow multipliers, such that a given average flow rate (e.g., drum water flow rate) may be maintained over relatively smaller changes in flows and maintaining the given average flow rate despite certain variations that typically may interfere with the given average flow rate. Specifically, the industrial control system embodiments described herein may use closed loop flow rate control (CLFRC) to determine a variable flow multiplier based at least in part on the commanded flow rate and a measured flow rate. The variable multiplier may be applied to a flow rate command of the industrial system, e.g., the HRSG.

As such, the CLFRC may account for variations due to the environment, manufacturing of the industrial system, operation of the industrial system, and the like. The industrial control system may thus enable the industrial system to achieve a given average flow rate over a larger span of operational characteristics (e.g., smaller flow changes) and maintain the given average flow at a constant rate over the change in flows. As used herein, "flow rate" may refer to a change of a measure of fluid flow (e.g., amount of fluid flowing in a given unit of time into a container such as a tank or drum of the HRSG). For example, the "flow rate" may be measured in units of liquid flow per unit time (e.g., liters/min, milliliters/sec), and the like. The techniques described herein may be applicable to other turbomachinery, such as industrial drums or boilers, chillers, and so on.

With the foregoing in mind, an example of an industrial system is illustrated in FIG. 1. While the present embodiments are discussed with respect to a gas turbine system (e.g., as illustrated in FIG. 1), it should be appreciated that the industrial system 10 may, in some embodiments, include a steam turbine system, a hydraulic turbine system, one or more compressor systems (e.g., aeroderivative compressors, reciprocating compressors, centrifugal compressors, axial compressors, screw compressors, and so forth), one or more electric motor systems, industrial systems including, for example, fans, extruders, blowers, centrifugal pumps, or any of various other industrial machinery that may be included in an industrial plant or other industrial facility.

As illustrated in FIG. 1, the industrial system 10 includes the gas turbine system 12, a monitoring and control system 14, and a fuel supply system 16. The gas turbine system 12 may include a compressor 20, combustion systems 22, fuel nozzles 24, a gas turbine 26, and an exhaust section 28. During operation, the gas turbine system 12 may pull air 30 into the compressor 20, which may then compress the air 30 and move the air 30 to the combustion system 22 (e.g., which may include a number of combustors). In the combustion system 22, the fuel nozzle 24 (or a number of fuel nozzles 24) may inject fuel that mixes with the compressed air 30 to create, for example, an air-fuel mixture.

The air-fuel mixture may combust in the combustion system 22 to generate hot combustion gases, which flow downstream into the turbine 26 to drive one or more turbine stages. For example, the combustion gases may move through the turbine 26 to drive one or more stages of turbine blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

The exhaust gas 36 may include thermal energy, and the thermal energy may be recovered by a heat recovery steam generation (HRSG) system 37. In combined cycle systems, such as the power plant 10, hot exhaust 36 may flow from the gas turbine 26 and pass to the HRSG 37, where it may be used to generate high-pressure, high-temperature steam. The steam produced by the HRSG 37 may then be passed through a steam turbine engine for further power generation. In addition, the produced steam may also be supplied to any other processes where steam may be used, such as to a gasifier used to combust the fuel to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle. In certain embodiments, liquid flows into drums included in the HRSG 37 may be controlled via flow control, for example, water flow control, as described in more detail below.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, the HRSG 37, and so forth.

In the current embodiments, the level rate may be implemented by the system 10 using Closed Loop Flow Rate Control (CLFRC). For example, the actuators 43 may include one or more fluid flow actuators or regulators that may be used implement a commanded fluid flow rate to HRSG 37. The CLFRC may, in one embodiment, apply a variable multiplier to one or more fluid flow actuators, which may be based on a desired, constant level of fluid. The variable multiplier may be chosen such that the instantaneous fluid flow rate matches the commanded fluid flow rate, or in some cases, a fluid flow rate that is calculated to maintain a given average fluid level over a desired range. The HMI operator interface 44 may be used to receive operator inputs that may be provided to the controller 38 (e.g., a user-specified fluid flow rate). As will be further appreciated, in response to the sensor 42 data and/or inputs received via the HMI operator interface 44, the controller 38 may control a fluid flow rate for certain components of the HRGS 37, such as drums. By applying the variable multiplier, the CLFRC may achieve the given average level rate over a relatively larger span of operational characteristics (e.g., smaller level changes, smaller fluid flow changes) than systems that do not implement CLFRC. Further, during startup, for example of the HRSG 37, swell and or shrinkage may be reduced, thus enabling a longer equipment life and improved energy efficiencies.

In certain embodiments, the HMI operator interface 44 may be executable by one or more computer systems of the system 10. A plant operator may interface with the industrial system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38. Further, operational information from the controller 38 and/or the sensors 42 may be presented via the HMI operator interface 44. Similarly, the controller 38 may be responsible for controlling one or more final control elements coupled to the components (e.g., the compressor 20, the turbine 26, the combustors 22, the load 34, and so forth) of the industrial system 10 such as, for example, one or more actuators 43, transducers, and so forth.

In certain embodiments, the sensors 42 may be any of various sensors useful in providing various operational data to the controller 38. For example, the sensors 42 may provide flow, pressure, and temperature of the compressor 20, speed and temperature of the turbine 26, vibration of the compressor 20 and the turbine 26, as well as flow for the exhaust gas 36, temperature, pressure and emission (e.g., $CO_2$, NOx) levels in the exhaust gas 36, carbon content in the fuel 31, temperature of the fuel 31, temperature, pressure, clearance of the compressor 20 and the turbine 26 (e.g., distance between the rotating and stationary parts of the compressor 20, between the rotating and stationary parts of the turbine 26, and/or between other stationary and rotating components), flame temperature or intensity, vibration, combustion dynamics (e.g., fluctuations in pressure, flame intensity, and so forth), load data from load 34, output power from the turbine 26, and so forth. The sensors 42 may also include flow sensors such as flowmeters (e.g., differential pressure flowmeters, velocity flowmeters, mass flowmeters, positive displacement flowmeters, open channel flowmeters) and liquid level sensors such as continuous level transmitters, ultrasonic transducers, laser level transmitters, and so on, disposed in the HRSG 37. Actuators 43 may include pumps, valves, linear actuators, switches, and the like.

The controller 38 may include a processor(s) 39 (e.g., a microprocessor(s)) that may execute software programs to perform the disclosed techniques. Moreover, the processor 39 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

The memory device 40 may store a variety of information, which may be suitable for various purposes. For example, the memory device 40 may store machine-readable and/or processor-executable instructions (e.g., firmware or software) for the processor execution. In one embodiment, the instructions, when executed, cause the processor 39 to determine a commanded fluid flow rate of the turbine system 12. For example, in one embodiment, the processor 39 may determine a desired constant level setpoint, derive a fluid flow rate setpoint to achieve the desired constant level setpoint, and command one or more actuators 42 based on the fluid flow rate setpoint. Indeed, in certain embodiments, the instructions cause the processor 39 to determine a measured flow rate of certain drums in the HRSG 37. The measured flow rate may refer to a flow rate of fluid in certain drums, such as boiler drums, high pressure drums, intermediate pressure drums, etc., disposed in the HRSG 37 as describe in more detail below.

Figure 2:
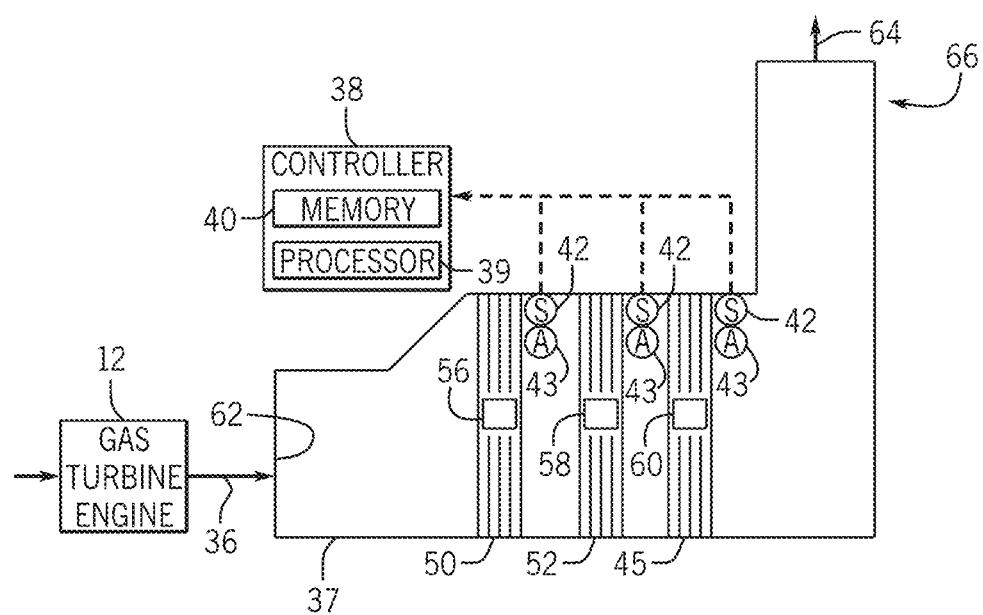
FIG. 2 is a block diagram of a heat recovery steam generation (HRSG) system included in the industrial system of FIG. 1, in accordance with an embodiment of the present disclosure.
Figure 3:
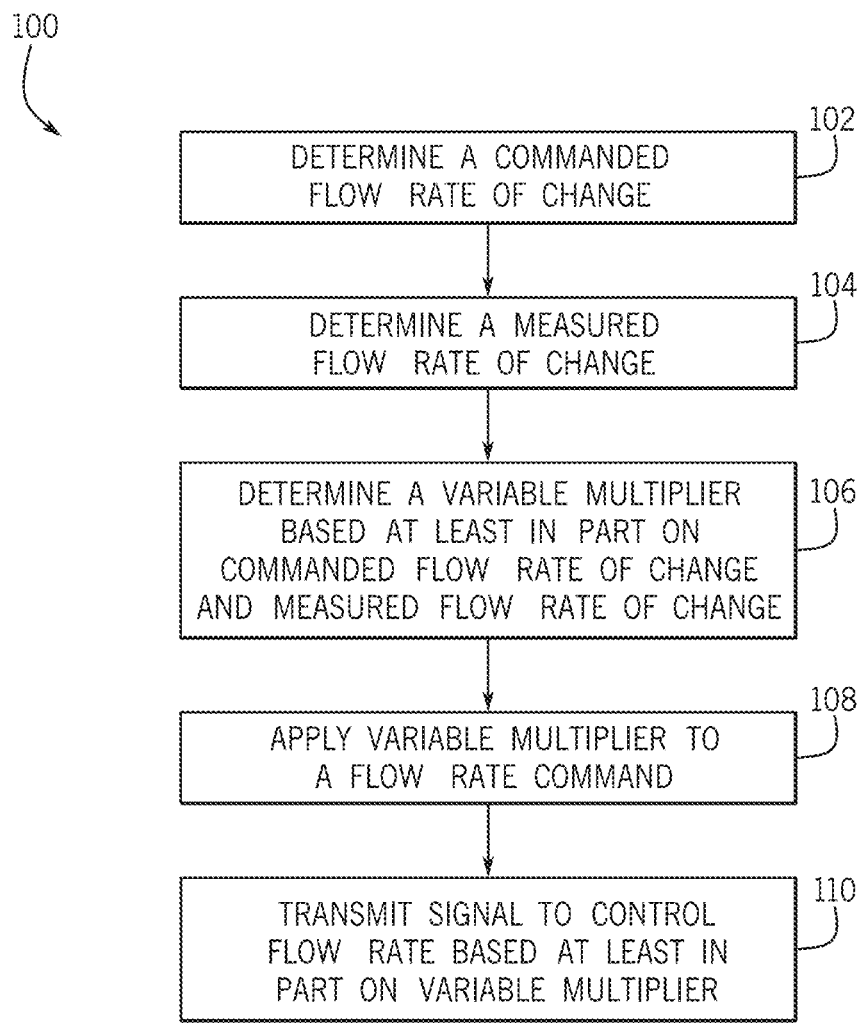
FIG. 3 is flowchart of a process for controlling a flow rate of one or more drums of the HRSG system of FIG. 2, in accordance with an embodiment of the present disclosure.

FIG. 2 is a block diagram of an embodiment of the HRSG 37 with one or more HRSG sections (e.g. evaporator sections), each including at least one drum. As shown in FIG. 1, the HRSG 37 includes a high-pressure (HP) evaporator section 50, an intermediate-pressure (IP) evaporator section 52, and a low-pressure (LP) evaporator section 54. The HP evaporator section 50 generates HP steam, the IP evaporator section 52 generates IP steam, and the LP evaporator section 54 generates LP steam. Each section 50, 52, and 54 is a heat exchanger that generates steam by transferring heat from the heated exhaust gas 36 to water or steam. As discussed in detail below, each of the sections 50, 52, and 54 may include a drum, such as drums 56, 58, and 60. The HP section 50 is located near an inlet section 62 of the HRSG 37. As the temperature of heated exhaust gas 36 from the gas turbine engine 12 may be highest near the HP section 50, the HP section 50 generates high-pressure steam. In other words, the high temperature of the heated exhaust gas 36 near the HP section 50 provides sufficient heat to convert liquid in the drum 56 into HP steam.

After the heated exhaust gas passes through the HP section 50, the IP section 52 may recover additional thermal energy, for example, by converting liquid in the drum 58 into IP steam. Likewise, the LP section 54 may recover additional thermal energy, for example, by converting liquid in the drum 60 into LP steam. The HP, IP, and LP steam may then be used, for example, to power steam turbines, such as HP, IP, and LP steam turbines, that may convert the steam into power. A cooled exhaust gas 64 may then exit the HRSG 37 from an HRSG stack 66, into the atmosphere. In other embodiments, certain sections, such as the IP section 52 and/or the LP section 54 may be omitted. Additional pressure sections (e.g., 1 to 10 extra HP, IP, and/or LP sections) may be added, or the HRSG 37 may be configured as a single-pressure system.

In certain embodiments, the controller 38 may be operatively coupled to the HRSG 37 via the sensors 42 and the actuators 43. The controller 38 may be used to control certain aspects (or all) of the HRSG 37 by executing, via the processor 39 computer instructions or code stored in the memory 40. For example, the controller 38 may send or receive signals from the one or more sensors 42 disposed in the HRSG 37, process the signals, and derive control actions that may be transmitted to the actuators 43. The sensors 42 may measure various conditions or parameters of the HRSG 37, such as, but not limited to, a flow rate of fluid entering or leaving a drum, a level of fluid within a drum, a temperature of a drum, a pressure of a drum, or any combination thereof.

More specifically, the controller 28 may use the information received from the sensors 43 to transmit actuation signals to the actuators 43 suitable for flow rate control of the fluid in the drums 56, 58, and/or 60. In one embodiment, the controller 28 may derive a desired fluid level, such as a constant fluid level. For example, during startup, a startup fluid level may be maintained by first adding or removing fluid into the drums 56, 58, and/or 60, to reach a startup fluid level, and then controlling fluid flow to maintain the startup fluid level constant during the startup process. By controlling fluid flow to maintain a constant fluid level, drum 56, 58, and/or 60 swelling may be minimized or eliminated. In certain embodiments, the constant fluid level may be determined by analyzing drum 56, 58, and/or 60 size, geometry (e.g., shape), thickness of walls, manufacturing materials, and/or fluid dynamics, such as fluid flow changes suitable for preventing swell, shrinkage, and so on, of the drums 56, 58, and/or 60 during temperature increases (e.g., startup temperature increases), or decreases. Likewise, fluid flow may be controlled, as opposed to fluid level, during baseload operations, shutdown operations, trip operations, and the like, of the turbine engine 12.

FIG. 2 is a flowchart of a process 100 for controlling a fluid flow rate for one or more of the drums 56, 58, and/or 60 of FIG. 2, in accordance with an embodiment of the present disclosure. The process 100 may be implemented as computer instructions executed by the processor 39 of the controller 38 and stored in the memory 40. In the depicted embodiment, the processor 39 may determine a commanded fluid flow rate, for example, for one or more of the drums 56, 58, and/or 60 of the HRSG 37 (block 102). In one embodiment, the commanded flow rate may be determined based on a fluid level setpoint for one or more of the drums 56, 58, and/or 60, wherein the fluid level setpoint is an amount of fluid to be kept at a constant level, for example, during startup operations, baseload operations, trip operations, shutdown operations, of the HRSG 37. Accordingly, the process 100 may determine a constant fluid level as part of the determination for the commanded flow rate (block 102). For example, during startup, a certain constant level fluid may be desired. Accordingly, the process 100 may derive the constant fluid level by analyzing drum 56, 58, and/or 60 size, geometry (e.g., shape), thickness of walls, manufacturing materials, and/or fluid dynamics, such as fluid flow changes suitable for preventing swell, for example, during temperature increases (e.g., startup temperature increases). Based on the desired constant fluid level, the process 100 may then determine the commanded flow rate to maintain the desired constant fluid level by analyzing, for example, drum 56, 58, and/or 60 size and geometry (e.g., shape), current exhaust 36 flow and temperature, and so on, to derive the commanded flow rate.

In some embodiments, the commanded flow rate may be a stepped input (e.g., where the amount of fluid level placed on the drums 56, 58, and/or 60 is changed in a series of one or more steps). In such embodiments, the commanded flow rate (e.g., commanded flow rate setpoint) is received (or derived) as a stepped flow rate input received at the controller 38 or from the HMI operator interface 44 or computed via the controller 38. As such, the processor 39 may determine the commanded fluid flow rate to be the stepped flow rate received at the monitoring and control system 14 or from the HMI operator interface 44, or otherwise derived via the controller 38.

In some embodiments, the fluid flow rate setpoint may be a ramped input (e.g., where the amount of fluid flow rate placed on the drums 56, 58, and/or 60 is varied in a ramped fashion). Successive varied fluid flow rate setpoint inputs may be received periodically, wherein a period between receiving consecutive updated flow rate setpoints may be based on the monitoring and control system 14 and/or standardization In such a scenario of ramped input, it may be advantageous to learn the rate at which the setpoint is ramped for use as a reference. The controller 38 may include rate detection logic that determines an elapsed time between the successive flow rate setpoints. The processor 39 may divide a difference between the successive flow rate amounts by the elapsed time to obtain an average flow rate. The commanded flow rate may then be determined to be the average flow rate. When the time between successive samples increases beyond a period threshold (e.g., a range of greater or equal to 8 seconds, 8.1 seconds, etc.), the flow rate setpoint is assumed to be stepped, and the commanded flow rate may be determined based on the stepped flow rate setpoint.

The controller 38 may determine a measured flow rate (block 104) of the drums 56, 58, and/or 60 based at least in part on sensors 42. For example, sensors 42 may measure flow rates going into inlets of the drums 56, 58, and/or 60, flow rates of fluid exiting outlets of the drums 56, 58, and/or 60, or a combination thereof. Other measurements taken (block 104) may include temperature measurements of various portions drums 56, 58, and/or 60, of the exhaust 36, and of the steam produced by the drums 56, 58, and/or 60. Other measurement (block 104) may also include pressure measurements of the exhaust 36, of the steam produced via drums 56, 58, and/or 60, and so on.

A flow level rate limit component may set increasing and decreasing flow rate thresholds. For example, the flow rate limit component of a filter may set increasing and decreasing flow rate thresholds to 1.5 times, 2 times, 3 times, or more times the determined commanded level rate. As such, noise that may be above a flow rate that may be commanded (e.g., above the increasing flow rate threshold or below the decreasing flow rate threshold) may be detected and reduced.

In some embodiments, a trajectory-style control may be implemented to match an average measured flow rate across the interval with the commanded flow rate. This trajectory-style control, in some embodiments, may be selectively enabled and/or disabled. In some embodiments, by default, the trajectory-style control is enabled. An average measured flow rate across an interval may be determined. Each time the commanded flow rate or the constant fluid level setpoint changes, the controller 38 may save a current HRSG drum level value and target HRSG drum level value. For example, the current drum level value and the target drum level value may be saved in the memory device 40. The difference between these values is divided by the commanded level rate to determine a time that elapsed during the change. A free-running timer may also be reset. A remaining flow rate change corresponding to a time between the interval and the elapsed time is divided by the difference between the interval and the elapsed time to give the average level rate that may be maintained for the rest of the interval. When enabled, the trajectory-style control may cause downstream logic to adjust the instantaneous flow rate to meet the average measured flow rate.

In some embodiments, the instructions may cause the processor 39 to determine a variable multiplier based at least in part on the commanded fluid flow rate and/or the measured fluid flow rate. Further, the instructions may cause the processor 39 to apply the variable multiplier to a flow rate command. For example, in one embodiment, the variable multiplier is applied to the flow rate command by multiplying the flow rate command by the variable multiplier. The controller 38 may then send a signal to a flow regulator of the turbine system 12 to control the flow rate of the turbine system 12 based on the multiplied flow rate command. As mentioned above, in contrast to the fixed multiplier techniques applied to controlling fluid level, by using the CLFRC techniques described herein, a variable multiplier may be frequently updated, resulting in a number of efficiencies. In some embodiments, the multiplier is updated to maintain fluid level at a constant value.

The controller 38 may determine (block 106) a variable multiplier based at least in part on the commanded flow rate and the measured flow rate. For example, the controller 38 may include a proportional-integral regulator that may calculate the variable multiplier based on the difference between the commanded flow rate and the measured flow rate. The measured flow rate may include either the instantaneous measured flow rate or the average measured flow rate as determined above. In some embodiments, the variable multiplier may be between a minimum and a maximum threshold. For example, the variable multiplier may be between 0.75 and a ratio of a desired (e.g., maximum) permissible level rate to the commanded level rate. In some embodiments, the variable multiplier may be set to 1 when the flow rate is within a certain deadband of the flow rate setpoint. Further, in some embodiments, when the controller 38 is booted up, the variable multiplier may be preset to 1.

The controller 38 may apply the variable multiplier to a flow rate command to the HRSG 37 (block 108). In some embodiments, the multiplied flow rate command may be further multiplied by a tuning multiplier. In some embodiments, the multiplied level rate command may be applied to the desired (e.g., maximum) flow rate before being supplied to an actuator 43 (e.g., pump, valve) to add or remove fluid from drums 56, 58, and/or 60.

The controller 38 may then send a signal to the turbine system 12 to control a flow rate based at least in part on the multiplied flow rate command (block 110). In some embodiments, the signal may be sent to a flow regulator (e.g., one or more of the actuators 43, such as pumps, valves, restrictors, and the like) of the HRSG 37. The actuator(s) 43 may then provide the commanded flow rate with the variable multiplier, which may provide fluid flow into the drums 56, 58, and/or 60, thus controlling the drums 56, 58, and/or 60 via fluid flow rate as opposed to fluid level. The resulting control may enable a more efficient HRSG 37, and may prolong life for the drums 56, 58, and/or 60. It is to be understood that the techniques described herein may be used to control other tanks or drums in other industrial machinery, including boilers, chemical plant tanks, and so on.

Technical effects of the present embodiments relate to systems and methods for controlling a flow rate in the industrial system. Specifically, the industrial control system may determine a variable multiplier based at least in part on the commanded flow rate and a measured flow rate, which may be applied to a flow rate command of the industrial system, such as a heat recovery steam generation (HRSG) system in lieu of level control. That is, rather than controlling drum level, the techniques described herein control flow rate. In one example, the flow rate may maintain a constant fluid level. The measured flow rate may be an instantaneous or an average measured flow rate. As such, variations due to the environment, manufacturing of the industrial system, operation of the industrial system, and the like, may be accounted for. The industrial control system may thus enable the industrial system to achieve a longer operational life.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
   determining, via a processor included in a control system, a commanded fluid flow rate into or out of a drum of an industrial system, wherein the commanded fluid flow rate comprises a rate of fluid entering the drum of the industrial system, exiting the drum of the industrial system, or a combination thereof, and wherein the rate of fluid comprises a volume of fluid per unit of time;
   determining, via the processor, a measured flow rate change of the fluid, wherein the measured flow rate change comprises a measured change in volume of fluid per unit of time, and wherein the measured flow rate change is a measured value resulting from the rate of fluid comprising the volume of fluid per unit of time entering or exiting of the drum of the industrial system as controlled via the commanded fluid flow rate;
   determining, via the processor, a variable multiplier based at least in part on the commanded fluid flow rate and the measured flow rate change;
   deriving, via the processor, a multiplied flow rate command for the industrial system by applying the variable multiplier to the commanded fluid flow rate; and
   transmitting, via the processor, a signal to the industrial system to control the rate of fluid entering the drum of the industrial system, exiting the drum of the industrial system, or the combination thereof, based at least in part on the multiplied flow rate command, wherein the signal is configured to actuate an actuator to maintain the drum at a constant fluid level.

2. The method of claim 1, comprising, deriving, via, the processor, the constant fluid level by analyzing a drum size, a drum geometry, a drum wall thickness, a drum material, applying fluid dynamics, or a combination thereof.

3. The method of claim 2, wherein deriving, via the processor, the constant fluid level comprises analyzing the drum size, the drum geometry, the drum wall thickness, the drum materials, the fluid dynamics, or the combination thereof, to minimize or eliminate drum swelling, drum shrinkage, or a combination thereof, of the drum.

4. The method of claim 1, wherein the industrial system comprises a heat recovery steam generation (HRSG) system having the drum.

5. A system comprising:
a controller configured to operatively couple to an industrial system having a drum, wherein the controller comprises a processor, wherein the processor is configured to:
determine a commanded fluid flow rate of the drum of the industrial system, wherein the commanded fluid flow rate comprises a rate of fluid entering the drum of the industrial system, exiting the drum of the industrial system, or a combination thereof, and wherein the rate of fluid comprises a volume of fluid per unit of time;
determine a measured flow rate change of the fluid, wherein the measured flow rate change comprises a measured change in volume of fluid per unit of time, and wherein the measured flow rate change is a measured value resulting from the rate of fluid comprising the volume of fluid per unit of time entering or exiting of the drum of the industrial system as controlled via the commanded fluid flow rate;
determine a variable multiplier based at least in part on the commanded fluid flow rate and the measured flow rate change; and
derive a multiplied flow rate command for the industrial system by applying the variable multiplier to the commanded fluid flow rate, wherein the processor is configured to transmit a signal to the industrial system to control the rate of fluid entering the drum of the industrial system, exiting the drum of the industrial system, or the combination thereof, based at least in part on the multiplied flow rate command, and wherein the signal is configured to actuate an actuator to maintain the drum at a constant fluid level.

6. The system of claim 5, wherein the processor is configured to derive the constant fluid level by analyzing a drum size, a drum geometry, a drum wall thickness, a drum material, applying fluid dynamics, or a combination thereof.

7. The system of claim 5, wherein the processor is configured to derive the constant fluid level to minimize or eliminate drum swelling, drum shrinkage, or a combination thereof, of the drum.

8. The system of claim 7, wherein the processor is configured to derive the constant fluid level to minimize or eliminate drum swelling, drum shrinkage, or a combination thereof, of the drum, taking into account a startup of the industrial system.

9. The system of claim 5, wherein the processor is configured to determine the commanded fluid flow rate based at least in part on receiving or deriving a stepped flow rate.

10. The system of claim 5, wherein the processor is configured to determine the commanded fluid flow rate based at least in part on receiving or deriving a ramped flow rate.

11. The system of claim 5, wherein the industrial system comprises a heat recovery steam generation (HRSG) system having the drum.

12. One or more tangible, non-transitory, machine-readable media comprising instructions configured to cause a processor to:
determine a commanded fluid flow rate of a drum of an industrial system, wherein the commanded fluid flow rate comprises a rate of fluid entering the drum of the industrial system, exiting the drum of the industrial system, or a combination thereof, and wherein the rate of fluid comprises a volume of fluid per unit of time;
determine a measured flow rate change of the fluid, wherein the measured flow rate change comprises a measured change in volume of fluid per unit of time, and wherein the measured flow rate change is a measured value resulting from the rate of fluid comprising the volume of fluid per unit of time entering or exiting of the drum of the industrial system as controlled via the commanded fluid flow rate;
determine a variable multiplier based at least in part on the commanded fluid flow rate and the measured flow rate change;
derive a multiplied flow rate command for the industrial system by applying the variable multiplier to the commanded fluid flow rate; and
transmit a signal to the industrial system to control the rate of fluid entering the drum of the industrial system, exiting the drum of the industrial system, or the combination thereof, based at least in part on the multiplied flow rate command, wherein the signal is configured to actuate an actuator to maintain the drum at a constant fluid level.

13. The one or more machine-readable media of claim 12, wherein the instructions configured to cause the processor to derive the constant fluid level comprise instructions configured to cause the processor to analyze a drum size, a drum geometry, a drum wall thickness, a drum material, apply fluid dynamics, or a combination thereof.

14. The one or more machine-readable media of claim 12, wherein the instructions to determine the measured flow rate comprises instructions to cause the processor to determine an average measured flow rate.

* * * * *